(12) United States Patent
Spalink et al.

(10) Patent No.: US 12,493,103 B2
(45) Date of Patent: Dec. 9, 2025

(54) RADAR DETERMINATION CIRCUITRY AND RADAR DETERMINATION METHOD

(71) Applicant: Sony Group Corporation, Tokyo (JP)

(72) Inventors: Gerd Spalink, Stuttgart (DE); Dmytro Rachkov, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 143 days.

(21) Appl. No.: 18/116,310

(22) Filed: Mar. 2, 2023

(65) Prior Publication Data
US 2023/0288531 A1    Sep. 14, 2023

(30) Foreign Application Priority Data
Mar. 9, 2022  (EP) ..................................... 22161108

(51) Int. Cl.
*G01S 7/295*    (2006.01)
(52) U.S. Cl.
CPC ................................... *G01S 7/295* (2013.01)
(58) Field of Classification Search
None
See application file for complete search history.

(56) References Cited

U.S. PATENT DOCUMENTS

| | | |
|---|---|---|
| 6,313,794 B1 | 11/2001 | Rose |
| 2012/0299773 A1 | 11/2012 | Stirling-Gallacher et al. |
| 2018/0203105 A1 | 7/2018 | Kuehnle |
| 2019/0128998 A1 | 5/2019 | Josefsberg et al. |
| 2020/0233076 A1 | 7/2020 | Chen |
| 2020/0284901 A1 | 9/2020 | Tierney et al. |
| 2021/0270933 A1 | 9/2021 | Hakobyan |
| 2022/0221570 A1* | 7/2022 | Zhu ........................ G01S 7/2883 |

FOREIGN PATENT DOCUMENTS

WO    WO-2021062750 A1    4/2021

OTHER PUBLICATIONS

Hector A Gonzalez et al: "Doppler disambiguation in MIMO FMCW radars with binary phase modulation", IET Radar Sonar Navigation, the Institution of Engineering and Technology, UK, vol. 15, No. 8, May 4, 2021 (May 4, 2021), pp. 884-901, XP006110656, ISSN: 1751-8784, DOI: 10.1049/RSN2.12063.

(Continued)

*Primary Examiner* — Whitney Moore
(74) *Attorney, Agent, or Firm* — XSENSUS LLP

(57) ABSTRACT

The present disclosure generally pertains to radar determination circuitry configured to:
- obtain a first received radar signal representing a first transmitted radar signal reflected at a scene;
- obtain a second received radar signal representing a second transmitted radar signal reflected at the scene, wherein
- the first transmitted radar signal and the second transmitted radar signal have a common chirp repetition frequency, and wherein
- the first transmitted radar signal is based on a first carrier frequency and the second as transmitted radar signal is based on a second carrier frequency different from the first carrier frequency; and
- determine an unambiguous parameter based on the first and the second received radar signals.

18 Claims, 14 Drawing Sheets

(56) References Cited

OTHER PUBLICATIONS

Jansen F G: "Automotive Radar Doppler Division MIMO With Velocity Ambiguity Resolving Capabilities", 2019 16th European Radar Conference (Eurad), EUMA, Oct. 2, 2019 (Oct. 2, 2019), pp. 245-248, XP033663894.
Visweswaran et al., "A 28-nm-CMOS Based 145-GHz FMCW Radar: System, Circuits, and Characterization", Journals & Magazines, IEEE Journal of Solid-State Circuits, vol. 56, Issue 7, Available Online At: https://ieeexplore.ieee.org/abstract/document/9316217/authors#authors, Jan. 6, 2021, 1 page.

* cited by examiner

RADAR DETERMINATION CIRCUITRY AND RADAR DETERMINATION METHOD

CROSS-REFERENCE TO RELATED APPLICATION

The present application claims priority to European Patent Application No. 22161108.0 filed Mar. 9, 2022, the entire contents of which are incorporated herein by reference.

TECHNICAL FIELD

The present disclosure generally pertains to radar determination circuitry and a radar determination method.

TECHNICAL BACKGROUND

Generally, it is known to determine positional parameters, such as a position, a distance, a velocity, or an angle based on radar technique.

Known radar signals may be based on a carrier frequency and a chirp repetition frequency.

Carrier frequency may refer to a frequency of a signal envelope, wherein a chirp is a time period of continuously changing carrier frequency and chirp repetition frequency may refer to the rate of generating copies of a chirp.

However, radar measurements may be subject to a measurement ambiguity due to a cyclic nature of the radar signal. It is known to vary the chirp repetition frequency for resolving the ambiguity, such that two different signals with different chirp repetition frequencies may be used, each of them indicating the true positional parameter.

Although there exist radar techniques, it is generally desirable to provide radar determination circuitry and a radar determination method.

SUMMARY

According to a first aspect, the disclosure provides radar determination circuitry configured to:
  obtain a first received radar signal representing a first transmitted radar signal reflected at a scene;
  obtain a second received radar signal representing second transmitted radar signal reflected at the scene, wherein the first transmitted radar signal and the second transmitted radar signal have a common chirp repetition frequency, and wherein
  the first transmitted radar signal is based on a first carrier frequency and the second transmitted radar signal is based on a second carrier frequency different from the first carrier frequency; and
  determine an unambiguous parameter based on the first and the second received radar signals.

According to a second aspect, the disclosure provides a radar determination method comprising:
  obtaining a first received radar signal representing a first transmitted radar signal reflected at a scene;
  obtaining a second received radar signal representing a second transmitted radar signal reflected at the scene, wherein
  the first transmitted radar signal and the second transmitted radar signal have a common chirp repetition frequency, and wherein
  the first transmitted radar signal is based on a first carrier frequency and the second transmitted radar signal is based on a second carrier frequency different from the first carrier frequency; and
  determining an unambiguous parameter based on the first and the second received radar signals.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
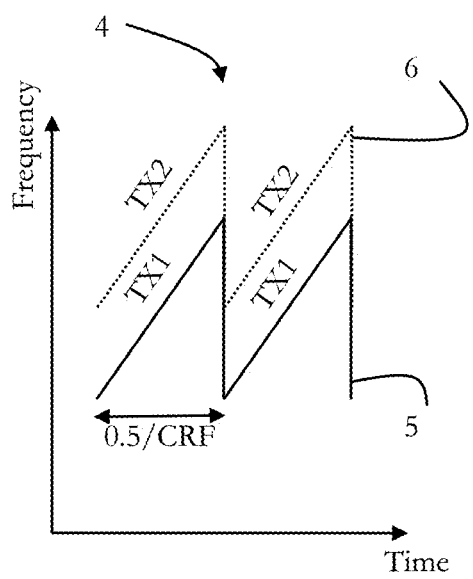
FIG. 2 depicts a radar signal transmission scheme according to the present disclosure.

Before a detailed description of the embodiments starting with FIG. 2 is given, general explanations are made.

As mentioned in the outset, radar techniques for resolving a measurement ambiguity are generally known. However, it has been recognized that known techniques which are based on varying the chirp repetition frequency (CRF) may lead to the case that corresponding frames can only be processed consecutively, whereas it has been recognized that it is desirable to process frames simultaneously.

Moreover, it has been recognized that it is desirable to provide a radar system that achieves a high frame rate and a high number of virtual antenna channels for determining an unambiguous speed, e.g., for automotive applications (e.g., in the range of minus four hundred kilometer per hour to plus two hundred kilometer per hour).

Moreover, it has been recognized that known chirp sequence radars may be limited to CRFs in the order of twenty, kilohertz, which may not be sufficient to provide above automotive detection values.

It is known to provide additional techniques for extending a native speed detection, such as transmitting additional frame to form Chinese Remainder pairs, which, however, may halves a frame rate.

It has further been recognized that a high number of virtual antennas may be achieved by using a MIMO array, including multiple transmission antennas and multiple reception antennas, which may be time multiplexed, thereby reducing a pulse repetition frequency, which, however, may reduce a maximum detectable native speed.

Hence, it has been recognized to provide dedicated hardware to transmit and receive at two or more different frequencies simultaneously. For example, two or more independent phase-lock loops (e.g., at a frequency of seventy-seven Gigahertz) may be used, wherein a reference clock and a ramp generation may be shared.

It has further been recognized that, instead of varying the CRF, different carrier frequencies may be utilized.

Moreover, a (large) virtual MIMO array may be provided based on an arrangement of phase centers of transmission and reception antennas, wherein virtual sub-array may be provided sharing at least one colocation, which may allow to resolve a phase uncertainty which may arise through using different carrier frequencies.

Based on a frequency multiplex according to the present disclosure, Chinese Remainder pairs of frames may be generated and a larger virtual array may be generated without compromising a frame rate.

Moreover, it has been recognized that a virtual array may be influenced by a positioning and spacing of a physical array, thereby obtaining a large aperture and a large angular resolution.

Furthermore, according to the present disclosure, it may be possible to achieve the following effects:

No power loss due to shaped noise and negative image
No need for IQ modulator in transmission antenna
No undesired energy in a transmission radar spectrum
Arbitrary, large carrier difference
Increased (e.g., double) frame rate or twice as many modes at the same frame rate
Speed disambiguation in a single frame
Angle disambiguation
Increased (e.g., double) output power than single tone
(At least) double chirp rate
No TX power combiner loss
Using if all antennas in a MIMO array Therefore, some embodiments pertain to radar determination circuitry configured to: obtain a first received radar signal representing a first transmitted radar signal reflected at a scene; obtain a second received radar signal representing a second transmitted radar signal reflected at the scene, wherein the first transmitted radar signal and the second transmitted radar signal have a common chirp repetition frequency, and wherein the first transmitted radar signal is based on a first carrier frequency and the second transmitted radar signal is based on a second carrier frequency different from the first carrier frequency; and determine an unambiguous parameter based on the at least two received radar signals.

Circuitry may pertain to any entity or multitude of entities capable of processing radar data, such as any type of processor, such as one or multiple CPU(s) (central processing unit) or GPU(s) (graphics processing unit) or a combination of different processors. Circuitry may further include one or multiple FPGAs (field programmable gate array), or the like.

In some embodiments, circuitry includes respective sensors (e.g., a radar), wiring, and the like without limiting the present disclosure in that regard.

The circuitry may be configured to obtain one or more radar signals, to which it may be referred to as received radar signals, which may represent (emitted/transmitted) radar signals (from one or more transmission radar antennas), reflected at a scene, and detected by one or more reception radar antennas.

It should be noted that, according to the present disclosure, one transmission antenna may transmit a multiplexed signal, thereby transmitting multiple transmitted radar signals (including a first and a second transmitted radar signal), or two transmission antennas transmitting two or more transmitted radar signals (including a first and a second transmitted radar signal).

Hence, in some embodiments, the first and the second transmitted radar signals may be transmitted simultaneously, whereas in other embodiments, the transmitted radar signals may be transmitted consecutively, (partly) overlapping, or the like.

The first and the second transmitted radar signal may have a common chirp repetition frequency (CRF), i.e., a frequency or rate in which a frequency of the first and the second transmitted radar signal changes (i.e., increases or decreases).

However, their respective carrier frequencies may differ from each other, i.e., the first transmitted radar signal may be based on a first carrier frequency and the second transmitted radar: signal may be based on a second carrier frequency different from the first carrier frequency.

Based on the first and the second received radar signal, an unambiguous parameter (e.g., an unambiguous distance, an unambiguous position, an unambiguous velocity, and/or an unambiguous angle) may be determined.

For determining the unambiguous parameter, in some embodiments, the radar determination circuitry is further configured to: determine a first measured parameter based on the first received radar signal, the first measured parameter being subject to a measurement ambiguity; and determine a second measured parameter based on the second received radar signal, the second measured parameter being subject to a measurement ambiguity.

As it is generally known, a parameter (or more) may be determined based on radar technology, such as a velocity, a distance, a position, an angle, and/or the like. However, due to a cyclic nature of a radar signal, the determination of such parameters may be subject to measurement ambiguity.

Accordingly, in the present disclosure, the first and the second measured parameters may refer to a determination of the parameters, as it may be commonly known and thus, the first and the second measured parameters may also be subject to an ambiguity. However, as indicated above, the (at least) two transmitted radar signals may have different CRFs for removing the ambiguity.

For removing the ambiguity, in some embodiments, the radar determination circuitry may be further configured to: determine a first estimated parameter based on the first measured parameter; and determine a second estimated parameter based on the second measured parameter.

The first and second estimated parameters may be derived based on a Chinese Remainder Theorem. For example, a measured parameter may correspond to a true parameter modulo an unambiguous parameter.

If the unambiguous parameter of the two measurements of the same object is different, the true parameter may be determined. For example, the true speed may be determined based on a hypothesis of integer multiples of the unambiguous parameter plus the respective measured parameter and based on an association of the two measurements (e.g., a comparison).

If the multiple of the two measurements is the same, it may correspond to the true parameter.

Accordingly, in some embodiments, the radar determination circuitry may be further configured to: determine hypotheses of the first and the second estimated parameters; and determine the unambiguous parameter, if respective hypotheses of the first and the second estimated parameters correspond to each other.

In some embodiments, the correspondence of the hypotheses includes a difference of the hypotheses being below a predetermined threshold or a ratio of the hypotheses being within a predetermined range.

In some embodiments, the radar determination circuitry is further configured to: determine the unambiguous parameter for at least two radar frames, thereby obtaining an unambiguous parameter for each frame.

For example, different Chines Remainder Theorem frames may be generated in parallel which may be input to a disambiguation scheme, as will be discussed below.

In some embodiments, the radar determination circuitry is farther configured to: select a predetermined number of unambiguous parameters obtained for each frame; and average the unambiguous parameters.

For example, multiple disambiguations may be carried out, wherein a subset of unambiguous parameters may be selected and then averaged, as will be discussed below.

In some embodiments, the radar determination circuity is further configured to: carry out a cross-disambiguation of the unambiguous parameters for each frame, as will be discussed below. Some embodiments pertain to a radar determination method including: obtaining a first received radar signal representing a first transmitted radar signal reflected at a scene; obtaining a second Ct received radar signal representing a second transmitted radar signal reflected at the scene, wherein the first transmitted radar signal and the second transmitted radar signal have a common chirp repetition frequency, and wherein the first transmitted radar signal is based on a first carrier frequency and the second transmitted radar signal is based on a second carrier frequency different from the first carrier frequency; and determining an unambiguous parameter based on the at least two received radar signals, as discussed herein.

The radar determination method(s) according to the present disclosure may be carried out with or by radar determination circuitry according to the present disclosure.

In some embodiments, the unambiguous parameter includes at least one of an unambiguous distance, an unambiguous position, an unambiguous velocity, and an unambiguous angle, as discussed herein. In some embodiments, the at least two transmitted radar signals are transmitted simultaneously, as discussed herein. In some embodiments, the method further includes: determining a first measured parameter based on the first received radar signal, the first measured parameter being subject to a measurement ambiguity; and determining a second measured parameter based on the second received radar signal, the second measured parameter being subject to a measurement ambiguity, as discussed herein. In some embodiments, the method further includes: determining a first estimated parameter based on the first measured parameter; and determining a second estimated parameter based on the second measured parameter, as discussed herein. In some embodiments, the method further includes: determining hypotheses of the first and the second estimated parameters; and determining the unambiguous parameter, if respective hypotheses of the first and the second estimated parameters correspond to each other, as discussed herein. In some embodiments, the correspondence of the hypotheses includes a difference of the hypotheses being below a predetermine threshold or a ratio of the hypotheses being within a predetermined range, as discussed herein. In some embodiments, the method further includes: determining the unambiguous parameter for at least two radar frames, thereby obtaining an unambiguous parameter for each frame, as discussed herein. In some embodiments, the method further includes: selecting a predetermined number of unambiguous parameters obtained for each frame; and averaging the unambiguous parameters, as discussed herein. In some embodiments, the method further includes: carrying out a cross-disambiguation of the unambiguous parameters for each frame, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 1:
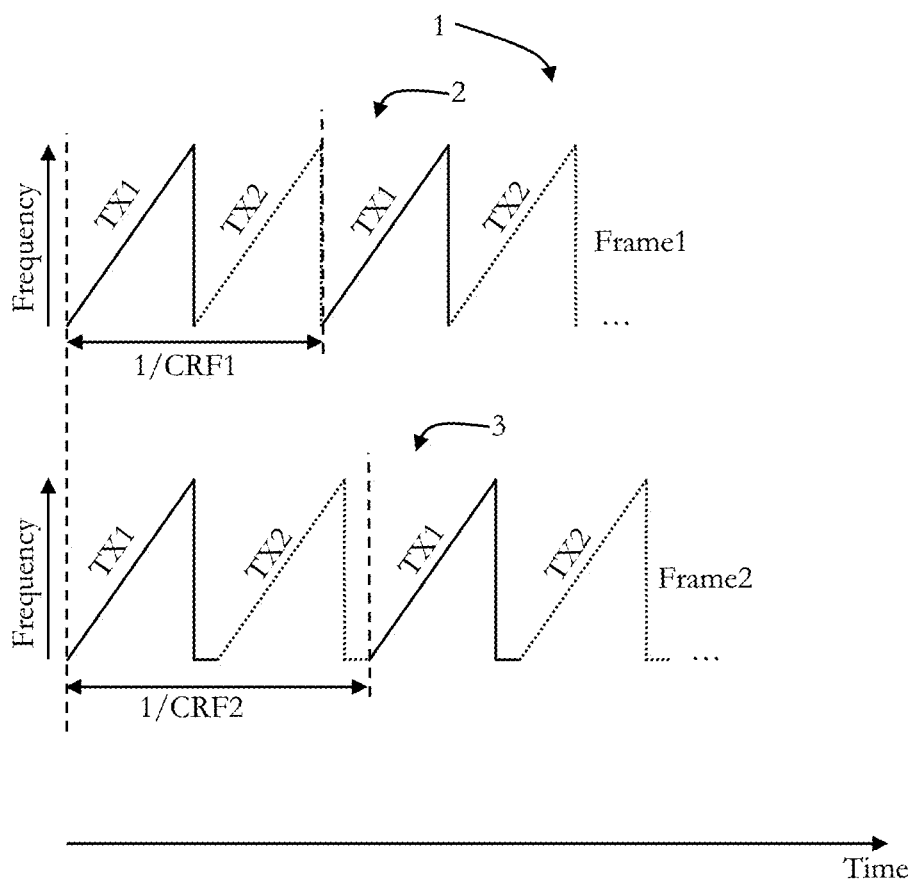
FIG. 1 depicts a radar signal transmission scheme as it is generally known.

FIG. 1 depicts a radar signal transmission scheme 1 as it is generally known.

The transmission scheme 1 includes a first transmitted radar signal 2 and a second transmitted radar signal 3. The first transmitted radar signal 2 has a first chirp repetition frequency CRF1 and the second transmitted radar signal 3 has a second chirp repetition frequency CRF2, such that their respective frame length is different. N repetitions of two chirps constitute Frame1 and Frame2. The first transmitted radar signal 2 has a first frame length N/CRF1 and the second transmitted radar signal 3 has a second frame length N/CRF2. The frames are transmitted sequentially.

However, their respective carrier frequencies of the antennas TX1 and TX2 are the same, i.e., the first and the second transmitted radar signals 2 and 3 differ in that their CRFs are different and thereby, their frame length, but their carrier frequencies are the same.

On the other hand, FIG. 2 depicts a radar transmission scheme 4 according to the present disclosure including a first transmitted radar signal 5 and a second transmitted radar signal 6 having the same CRF and thus, the same frame length. Hence, the two signals (and frames) can be transmitted and processed simultaneously since their frame length is one over two times the CRF. Thereby; the radar transmission scheme 4 may be up to four times faster than the radar transmission scheme 1 of the prior art.

For realizing such as transmission scheme, different possibilities are envisaged in the present disclosure, which will be described in the following under reference of FIGS. 3 to 12.

Figure 3:
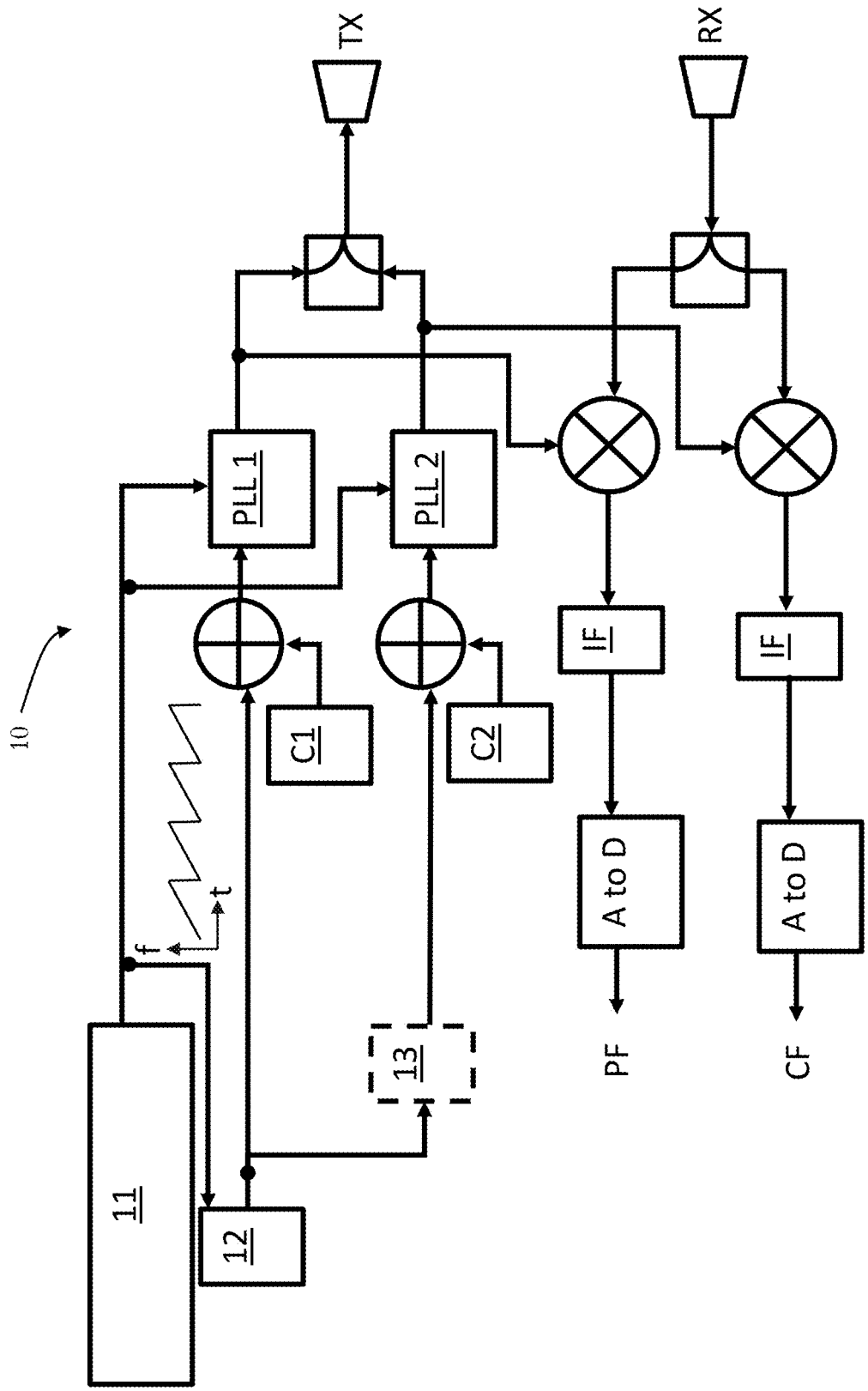
FIG. 3 depicts an embodiment of radar determination circuitry according to the present disclosure including one transmission antenna and one reception antenna.

FIG. 3 depicts an embodiment of radar determination circuitry according to the present disclosure in a circuit diagram 10.

A reference frequency 11 is Input into a ramp generator 12 and into two phase-lock loops PLL1 and PLL2.

The signal of the ramp generator is added to a first carrier frequency C1 and input the PLL1. Moreover, the signal of the ramp generator is added to a second carrier frequency C2 and input into the PLL2. If a time difference should be enabled, optionally, a delay 13 may be envisaged.

The outputs of PLL1 and PLL2 are input into a transmission antenna TX which emits a first and a second transmitted radar signal as one overlayed signal.

Moreover, the outputs of PLL1 and PLL2 are multiplied with signals received by a reception antenna, i.e., a first received radar signal and a second received radar signal. The respective received radar signals are then input into respective an intermediate frequency (IF) filters and converted from analogue to digital (A to D), thereby obtaining, in parallel, frames for carrying out a Chinese Remainder determination, as discussed herein. Exemplarily, the frames are called Parent Frame PF and Child Frame CF, but the present disclosure is not limited to that case.

Figure 4:
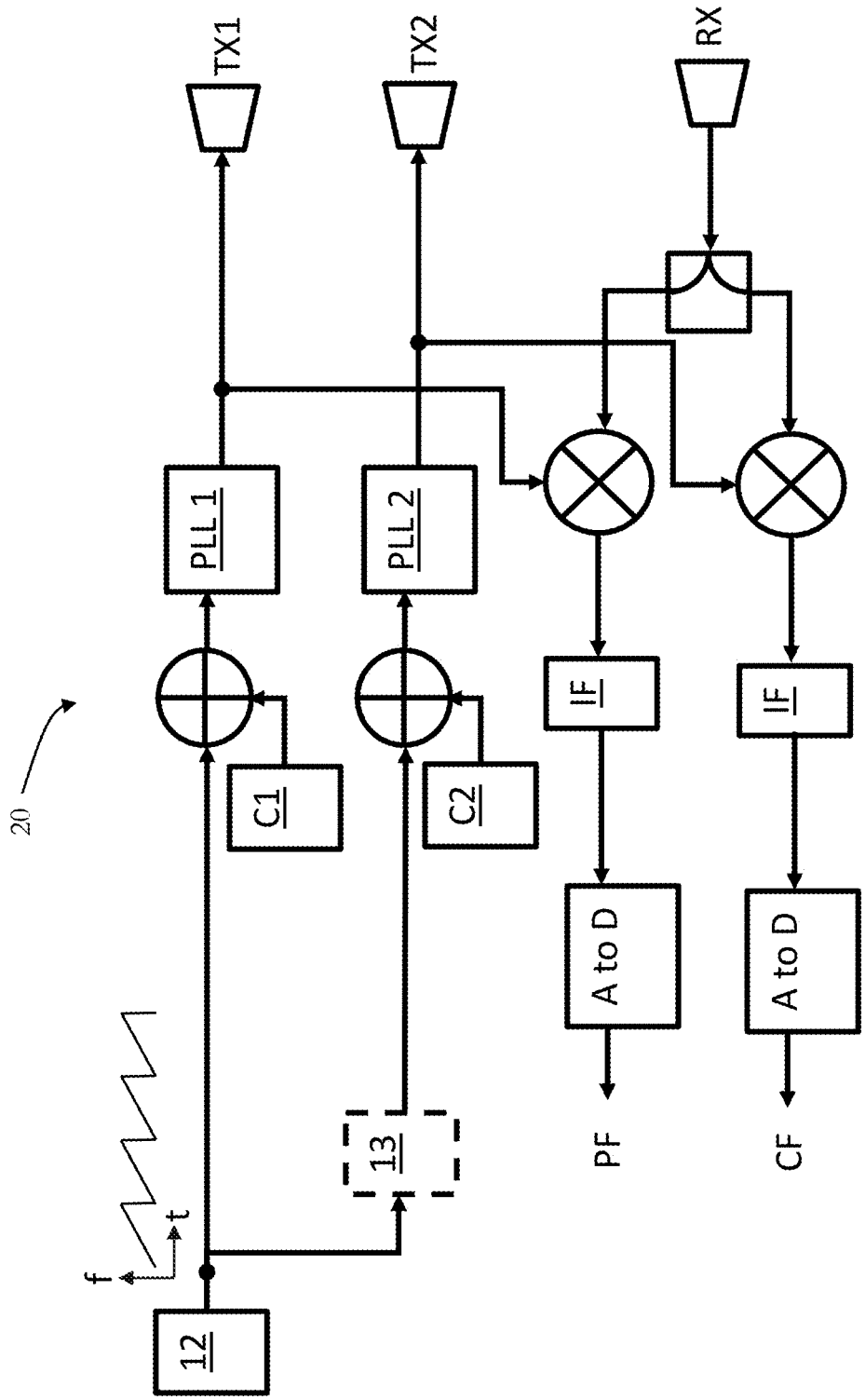
FIG. 4 depicts a further embodiment of radar determination circuitry according to the present disclosure including two transmission antennas and one reception antenna.

FIG. 4 depicts a further embodiment of radar determination circuitry according to the present disclosure in a circuit diagram 20.

In contrast to the radar determination circuitry of FIG. 3, the present embodiment includes two transmission antennas TX1 and TX2 The output of PLL1 is fed into TX1 and the output of PLL2 is fed into TX2.

On the reception side, the present embodiment is implemented as the embodiment of FIG. 3, but it should be noted that more reception antennas RX may be envisaged, which may be fed with the outputs of the PLL1 and PLL2 in a similar fashion as the reception antenna RX shown in FIG. 4.

Figure 5:
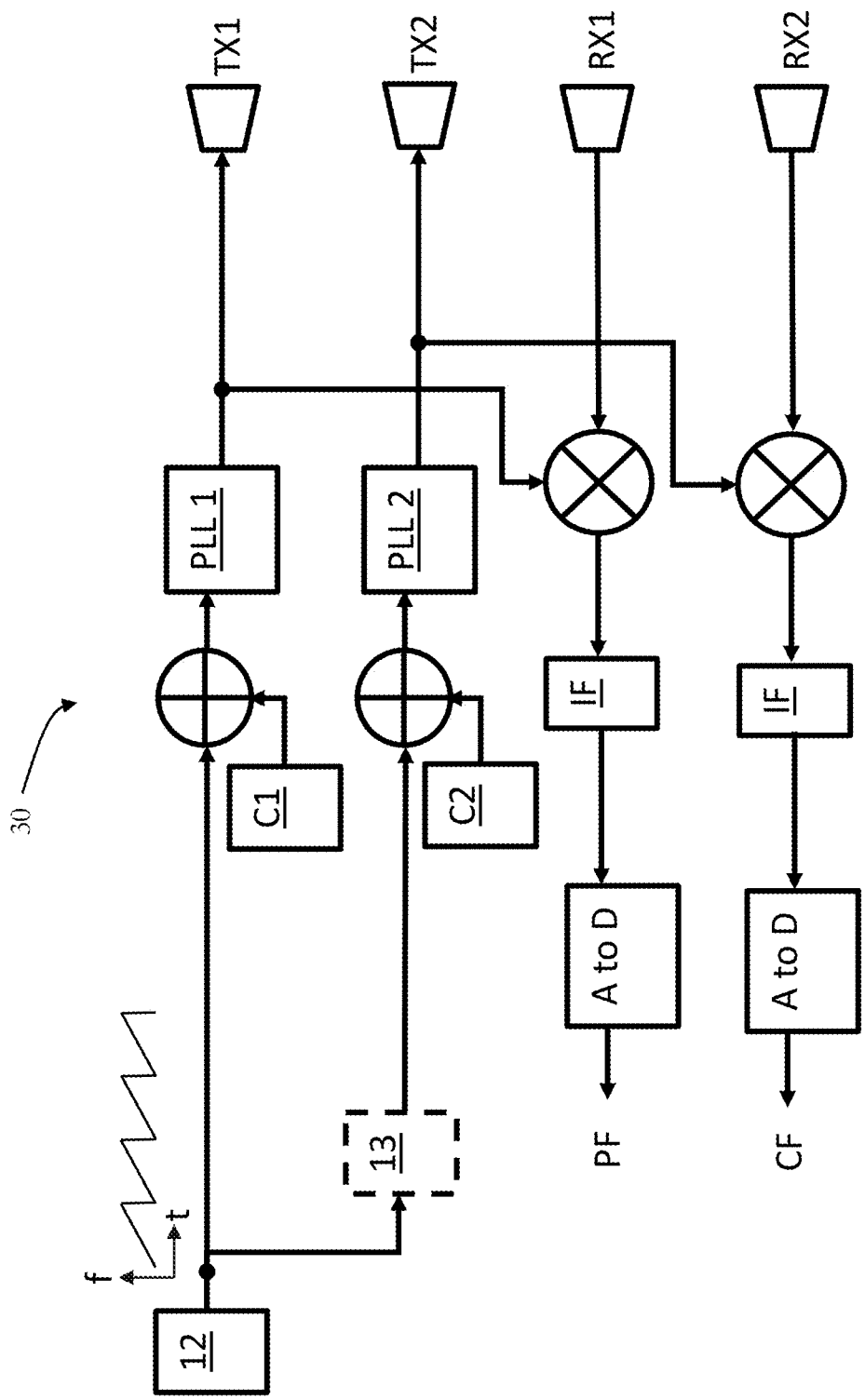
FIG. 5 depicts a further embodiment of radar determination circuitry according to the present disclosure including two transmission antennas and two reception antennas.

FIG. 5 depicts a further embodiment of radar determination circuitry according to the present disclosure in a circuit diagram 30.

In contrast to the embodiment of FIG. 3, two transmission antennas TX1 and TX2 and two reception antennas RX1 and RX2 are utilized.

The output of PLL1 is used for transmission antenna TX1 and for reception antenna RX2, and the output of PLL2 is used for transmission antenna TX2 and RX2.

It should be noted that more reception antennas or transmission antennas may be utilized using correspondingly more PLLs and using their outputs as described herein.

Figure 6:
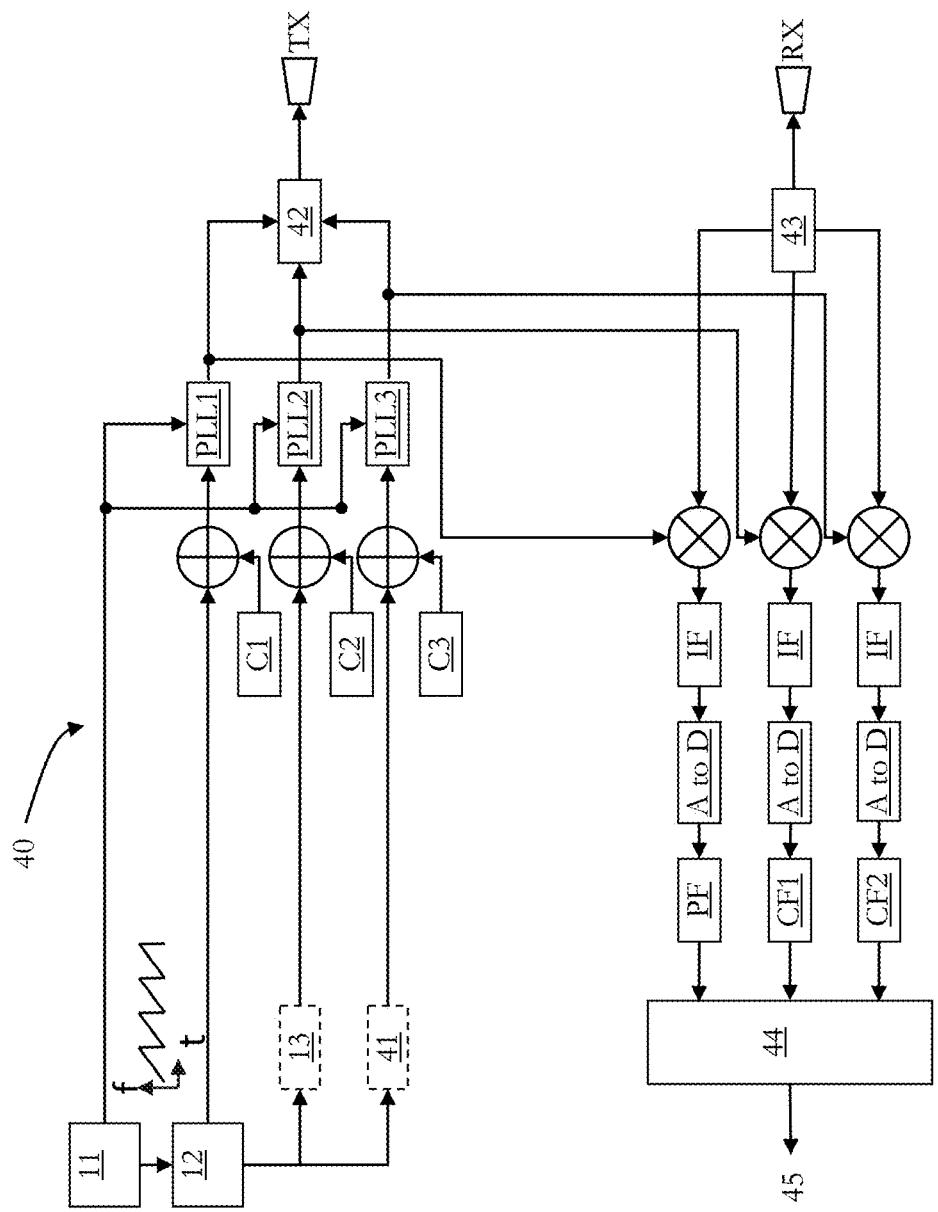
FIG. 6 depicts a further embodiment of radar determination circuitry according to the present disclosure including three phase-locked loops instead of two (as in FIGS. 3 to 5)

FIG. 6 depicts a further embodiment of radar determination circuitry according to the present disclosure in a circuit diagram 40.

In contrast to the embodiment of FIG. 3, three PLLs are used, namely PLL1, PLL2, and PLL3. Optionally, for PLL3, another delay 41 may be envisaged, if a time-difference is desired.

Hence, the reference frequency 11 is input into PLL1, PLL2, and PLL3. Moreover, the ramp signal is mixed with a first carrier signal C1 and input into PLL1, with a second carrier signal C2 and input into PLL2, and with a third carrier signal C3 and input into PLL3.

The outputs of the PLLs 1 to 3 are input into a triplexer 42 and the resulting signal is transmitted by transmission antenna TX.

Received radar signals are input, from reception antenna RX, into a triplexer 43 and resulting signals are compared with the outputs of the PLL1, PLL2, and PLL3, as already described above, thereby obtaining a Chinese Remainder Parent Frame PF and two Child Frames CF1 and CF2, which are subsequently input into a parameter disambiguation scheme 44, thereby obtaining: an unambiguous parameter 45.

In the following, different parameter disambiguation schemes are described under reference of FIGS. 7 to 9, wherein it should be noted that the present disclosure is not limited to the case that three frames (PF, CF1, and CF2) are used for the disambiguation since any number of frames may be used, such as two (as described under reference of FIGS. 3 to 5) or four or more.

Figure 7:
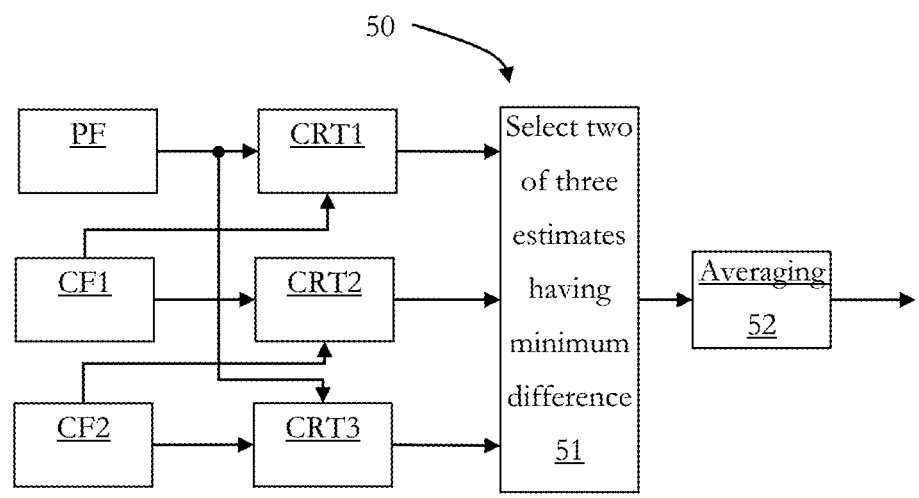
FIG. 7 depicts an embodiment of a parameter disambiguation scheme in a block diagram, in which an average of selected estimated parameter is determined.

FIG. 7 depicts an embodiment of a parameter disambiguation scheme 50 in a block diagram, which uses the above-described. Chinese Remainder Theorem (CRT) to determine estimated parameters, as discussed herein.

Based on PF and CF1, a first estimate CRT1 is obtained. Based on CF1 and CF2, a second estimate CRT2 is obtained. Based on PF and CF2, a third estimate CRT3 is obtained.

Two of the three estimates with minimum difference are selected, at 51, and then, averaged, at 52, thereby obtaining the unambiguous parameter.

Figure 8:
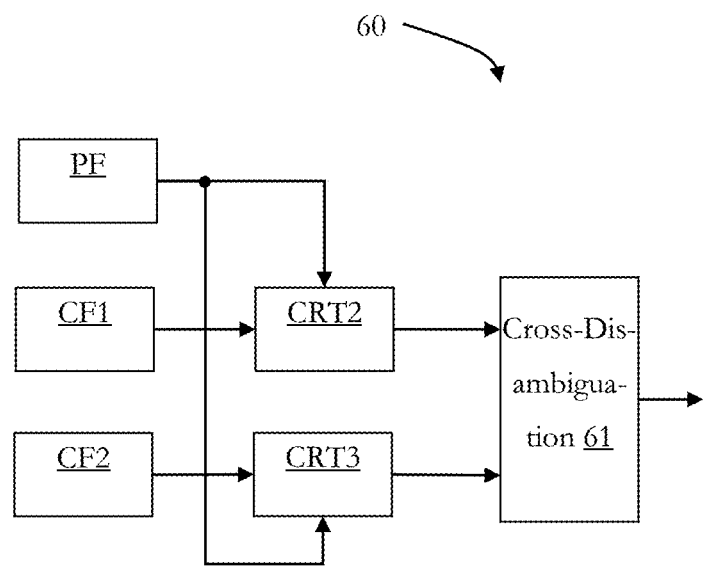
FIG. 8 depicts an embodiment of a parameter disambiguation scheme in a block diagram, in which a cross-disambiguation is carried out.

FIG. 8 depicts a further embodiment of a parameter disambiguation scheme 60 in a block diagram, which is different from the embodiment of FIG. 7 in that only two estimates CRT2 and CRT3 are obtained, wherein PF and CF1 are used for CRT2 and PF and CF2 are used for CRT3.

Based on CRT2 and CRT3, a cross-disambiguation is carried out, thereby obtaining the unambiguous parameter. A cross-ambiguation may be carried out as follows.

PF, CF1, and CF2 may be designed such that they have non-equal unambiguous diapasons for the estimated parameters. Based on PF and CF1, a first estimate CRT1 may be obtained with a new unambiguous diapason, which may be bigger than the unambiguous dipasons for PF and CF1 alone. Based on PP and CF2, a second estimate CRT2 may be obtained With a new unambiguous diapason, which may be bigger than the unambiguous diapasons for PF and CF2 alone and which may be different to that of CRT1. Based on CRT1 and CRT2, a new estimate may be obtained (in FIG. 8, at 61) with a new unambiguous diapason, which may be bigger than that of CRT1 and CRT2 alone.

In the following, a numeric example is given for determining an unambiguous speed.

PF may be 5, CF1 may be 6 and CF2 may be 7. After CRT2, the unambiguous speed may be 5*6=30 and after CRT3, the unambiguous speed may be 5*7=35. Combining CRT2 and CRT3 with the same algorithm may result in an unambiguous speed of 5*6*7=210.

Figure 9:
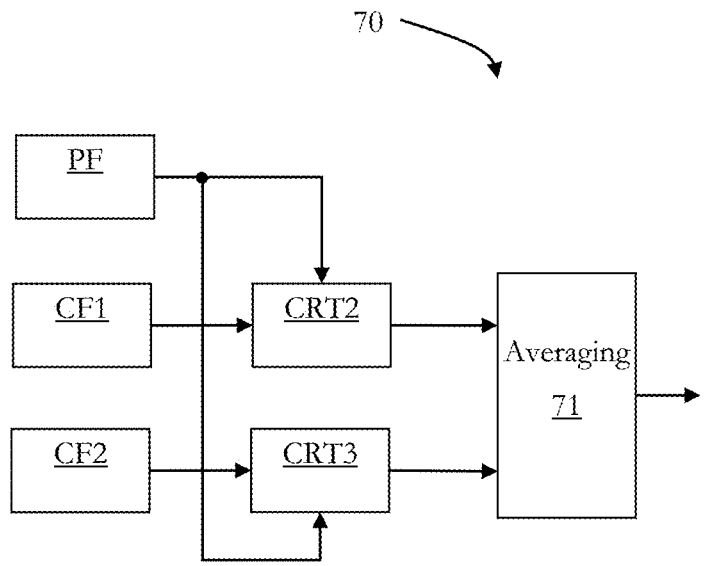
FIG. 9 depicts an embodiment of a parameter disambiguation scheme in a block diagram, in which all estimated parameters are averaged.

FIG. 9 depicts a further embodiment of a parameter disambiguation scheme 70 in a block diagram, which is different from the embodiment of FIG. 8 in that, instead of cross-disambiguation, the two estimates CRT2 and CRT3 are averaged at 71.

Ambiguity may derive from spacing of the antennas, as it is generally known. It has been recognized that carrier frequency difference may be used for disambiguation based on the antenna array spacing.

FIGS. 10 to 14 depict embodiments of antenna arrays according to the present disclosure taking the above recognition into account. With the following embodiments, in which radars may operate independently and/or incoherently, parameter disambiguation may be achieved. If angle disambiguation is desired, antenna spacing larger than λ is provided, in some embodiments. If time-offset operation is implemented (e.g., based on a delay, as discussed above), a MIMO (multiple input, multiple output array may be provided.

Figure 10:
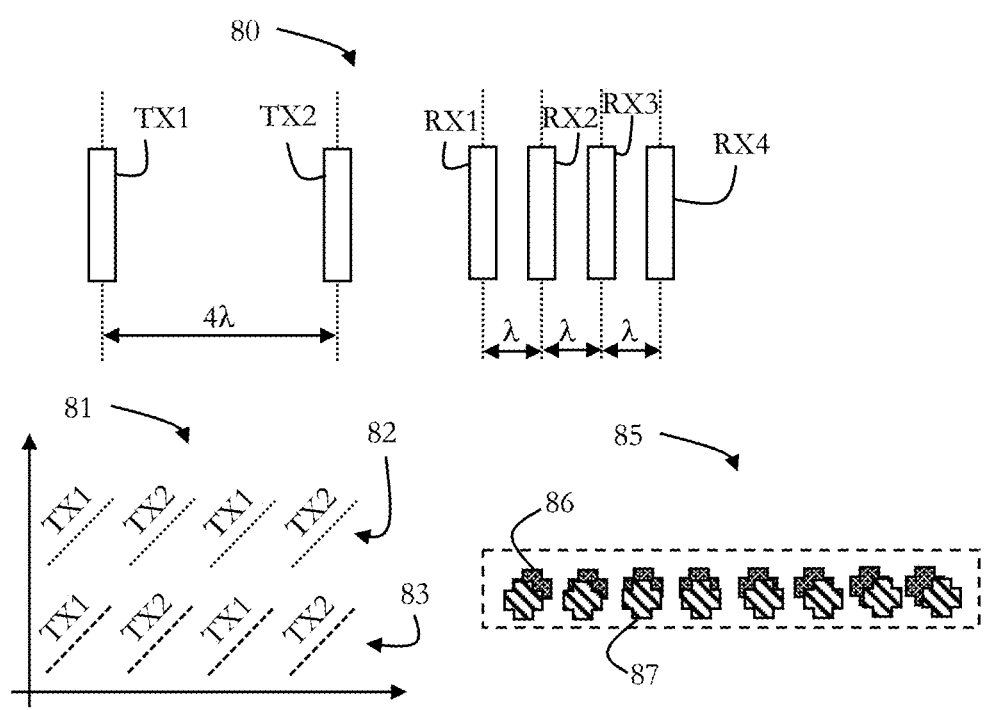
FIG. 10 depicts an embodiment of an antenna array including two transmission antennas and four reception antennas.

FIG. 10 depicts an embodiment of an antenna array 80, including two transmission antennas TX1 and TX2 spaced apart and four reception antennas RX1 to RX4, each spaced apart λ. In this, embodiment, it refers to a mean value between carrier 1 and carrier 2 without limiting the present disclosure in that regard.

It should be noted that the virtual antennas are drawn in units normalized to that wavelength, i.e. they may be longer or shorter, in some embodiments, and may not exactly correspond to λ.

FIG. 10 further depicts a transmission scheme 81 of the transmission antennas TX1 and TX2, in a frequency-versus-time diagram. A first carrier frequency range 82 and a second carrier frequency range 83 are depicted.

First, transmission antenna TX1 transmits a multiplexed radar signal on the two carrier frequency ranges 82 and 83, and after that transmission antenna TX2 transmits a multiplexed radar signal on the two carrier frequency ranges 82 and 83.

Virtual antennas 85 are shown, depicting the effect of the different wavelengths of the two carrier signals, i.e., a first carrier 86 (on the carrier frequency range 82) and a second carrier 87 (on the carrier frequency range 83).

Figure 11:
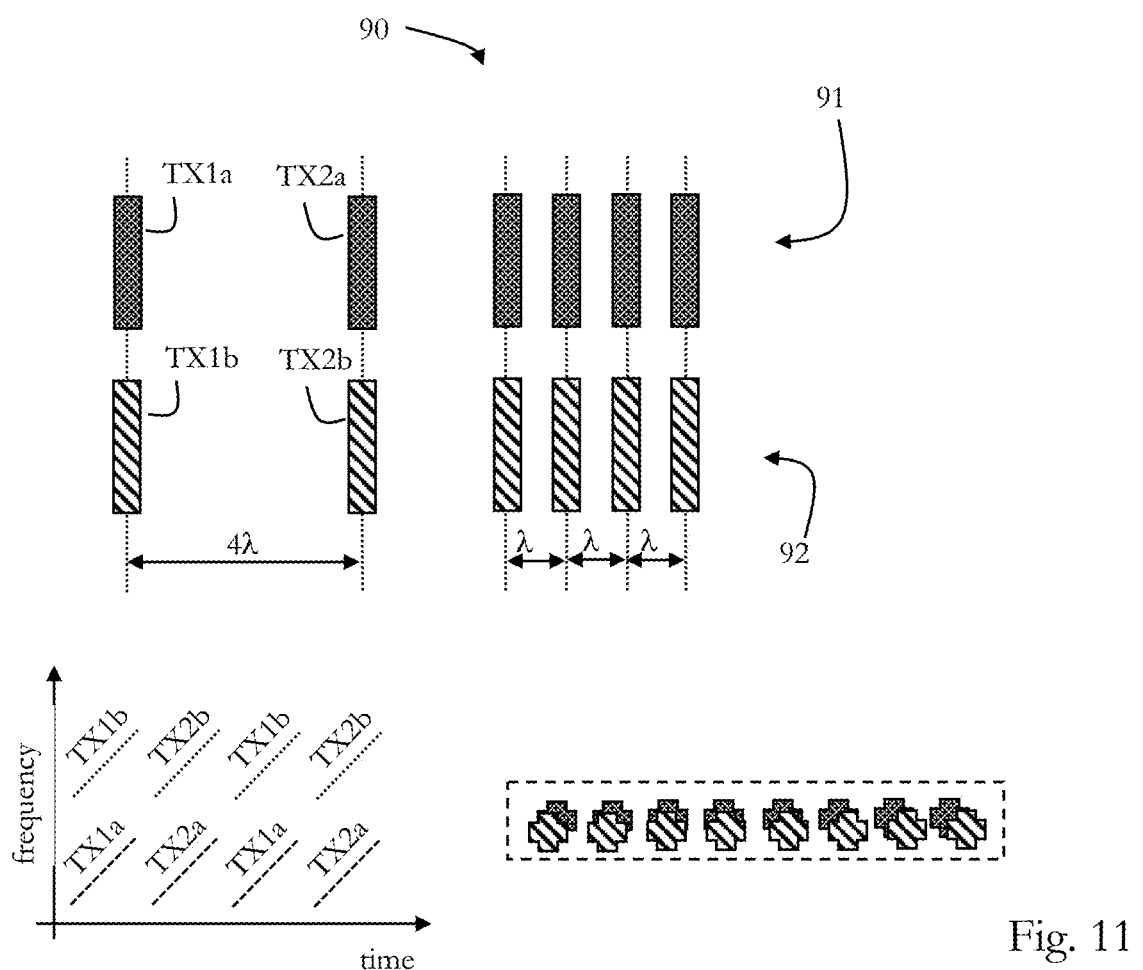
FIG. 11 depicts art embodiment of an antenna array including two sub-arrays each including two transmission antennas and four reception antennas.

FIG. 11 depicts a further embodiment of an antenna array 90 including a transmission scheme and a virtual array, wherein only the (physical) array 90 differs from the array of FIG. 10, such that the following description will be limited to the physical array 90 (which has the same antenna spacing a in FIG. 10).

A first sub-array 91 is used as the first carrier transmitting the first carrier frequency range and a second sub-array 92 is used as the second carrier transmitting the second carrier frequency range.

Figure 12:
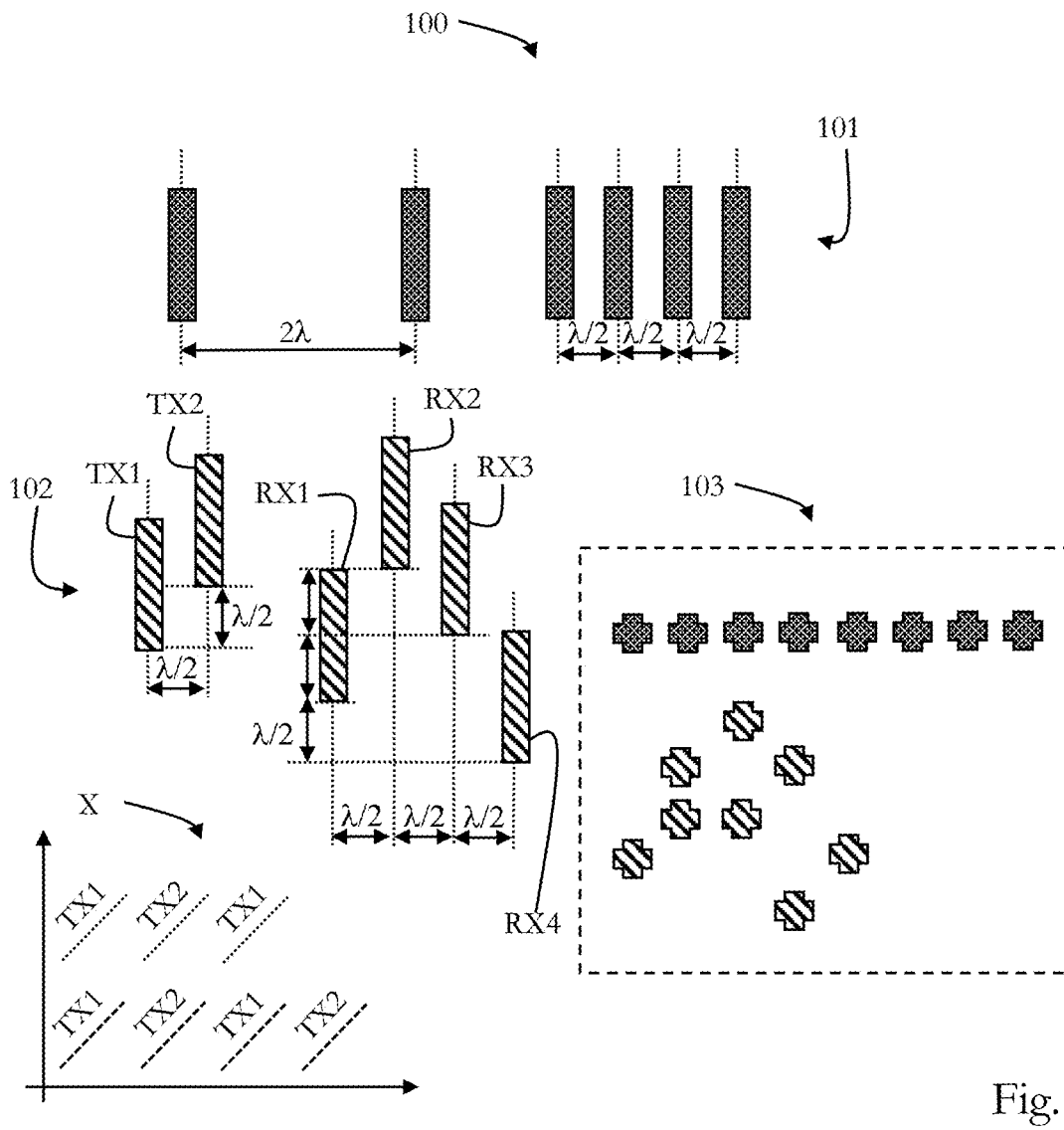
FIG. 12 depicts an embodiments of an antenna array including two sub-array, in which one of the two sub-arrays is distributed among a plane and not along a straight line, as in FIGS. 10 and 11.

FIG. 12 depicts a further embodiment of an antenna array 100 including a first sub-array 101 firs the first carrier and a second sub-array 102 for the second carrier.

The first sub-array 101 has an arrangement similar as in FIGS. 10 and 11, i.e., a linear antenna arrangement, but the transmission antennas TX1 and TX2 are spaced apart only 2λ and the reception antennas RX1 to RX4 are spaced apart λ/2.

However, the second sub-array 102 for the second carrier is not arranged linearly. The transmission antennas TX1 and TX2 are spaced apart λ/2 for in a horizontal direction and λ/2 in a vertical direction.

The reception antennas RX1 to RX4 of the second carrier are also not arranged linearly. In a horizontal direction, the reception antennas are spaced apart λ/2, but in a vertical direction, a bottom of RX2 is arranged roughly at a top of RX1. A top of RX3 is arranged roughly at the middle of RX2, such that a bottom of RX3 is arranged roughly in the middle of RX1. A top of RX4 is arranged roughly at the bottom of RX3.

Hence, a virtual antenna array 103 is also different, in this embodiment. While virtual antennas of carrier 1 are arranged linearly, virtual antennas of carrier 2 are not arranged linearly, similar to the physical antennas of carrier 2.

Figure 13:
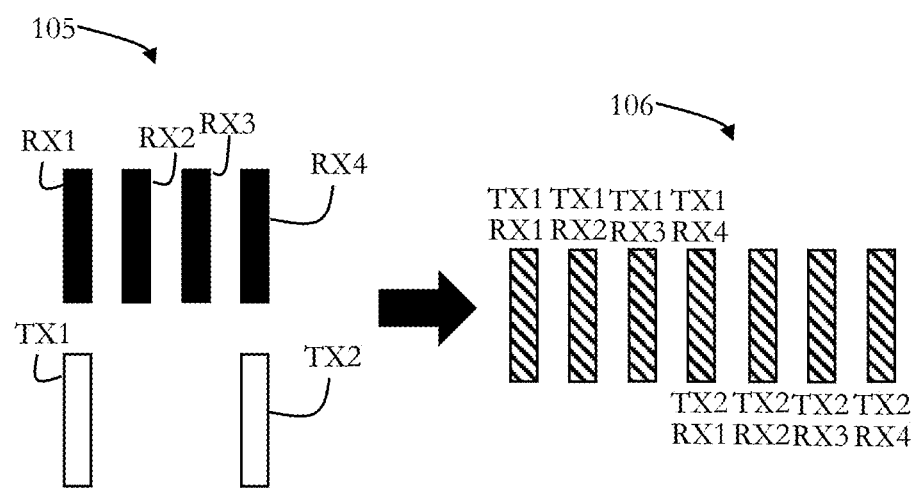
FIG. 13 depicts an embodiment of a array based on one radar including two transmission antennas and four reception antennas.

FIG. 13 depicts a further embodiment of a MIMO array using physical antennas 105, thereby generating virtual antennas 106. As can be taken from FIG. 13 there are eight virtual antennas based on the first transmission antenna TX1 multiplexed with the four reception antennas RX1 to RX4 and based on the second transmission antenna TX2 multiplexed with the four reception antennas RX1 to RX4. Hence, the virtual antenna array 106 is based on a colocation of the respective transmission and reception antennas.

As indicated above, TX1 and TX2 operate at different carrier frequencies, such that a phase relationship between TX1 and TX2 is ill-defined, which is solved by the colocation of antennas TX1 RX4 and TX2RX1 of the virtual array based on a single target assumption.

Single target assumption refers to, in this embodiment, that a phase gradient in each sub-array is assumed to be the same. Hence, if different angles are measured, an angle of one sub-array should be corrected, such that phase angles for the full array correspond to a best common linear fit.

The phase correction of a phase φ for the TX2 sub-array may be based on the formula φ=angle(TX1RX4/TX2RX1), and hence TX2_corrected=TX2*exp(iφ).

The expression TX1RX4/TX2RX1 refers to a virtual antenna or TXRX combination and may generally be a complex valued number, such that the formulas may consider complex number arithmetic.

Figure 14:
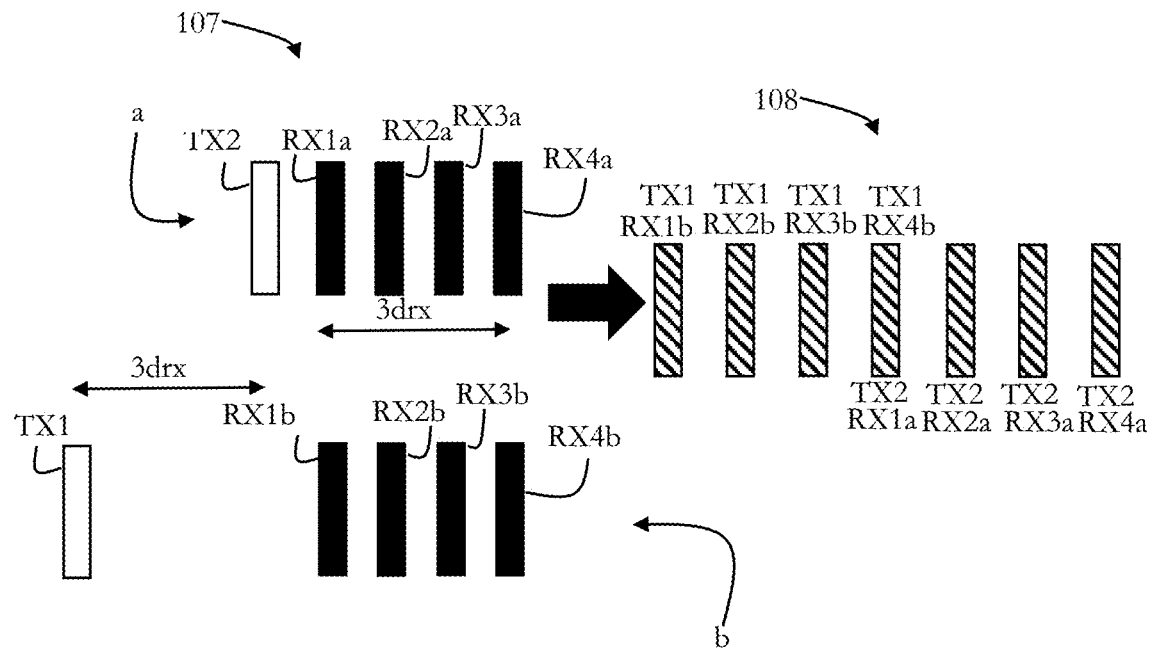
FIG. 14 depicts an embodiment of a MIMO array based on two radars each including one transmission antenna and four reception antennas.

FIG. 14 depicts a further embodiment of a MIMO array using physical antennas 107 implemented in a radar a and a radar b, wherein a first transmission antenna TX1 is associated with four reception antennas RX1b to RX4b, thereby constituting radar b, and a second transmission antenna TX2 is associated with four reception antennas RX1a to RX4a, thereby constituting radar b.

Based on radars a and b, a virtual MIMO array 108 including seven antennas is generated. In this embodiment, a colocation between TX1RX4b and TX2RX1a is provided, such that a corrected angle of radar a is obtained in a similar manner as described under reference of FIG. 13.

Figure 15:
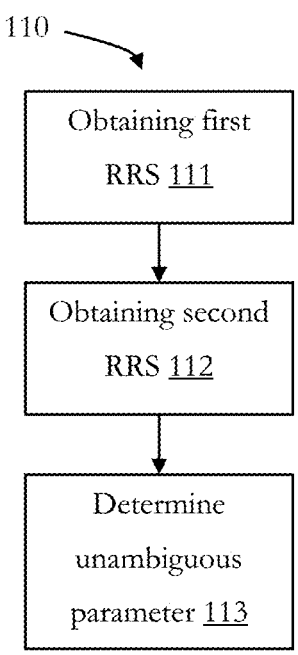
FIG. 15 depicts an embodiment of a radar determination method according to the present disclosure in a block diagram.

FIG. 15 depicts a radar determination method 110 according to the present disclosure in a block diagram.

At 111, a first received radar signal is obtained, as discussed herein.

At 112, a second received radar signal is obtained, as discussed herein.

At 113, an unambiguous parameter is determined, as discussed herein, which is, in this embodiment, an unambiguous angle.

Figure 16:
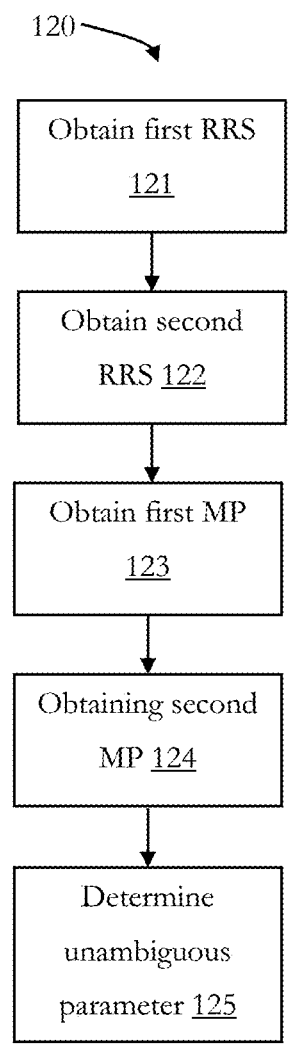
FIG. 16 depicts an embodiment of a radar determination method according to the present disclosure in a block diagram in which measured parameters are obtained.

FIG. 16 depicts a radar determination method 120 according to the present disclosure in a block diagram which is different: from the radar determination method 110 in that measured parameters are obtained.

At 121, a first received radar signal is obtained, as discussed herein.

At 122, a second received radar signal is obtained, as discussed herein.

At 123, a first measured parameter is obtained, as discussed herein.

At 124, a second measured parameter is obtained, as discussed herein.

At 125, an unambiguous parameter is determined, as discussed herein, which is, in this embodiment, an unambiguous distance.

Figure 17:
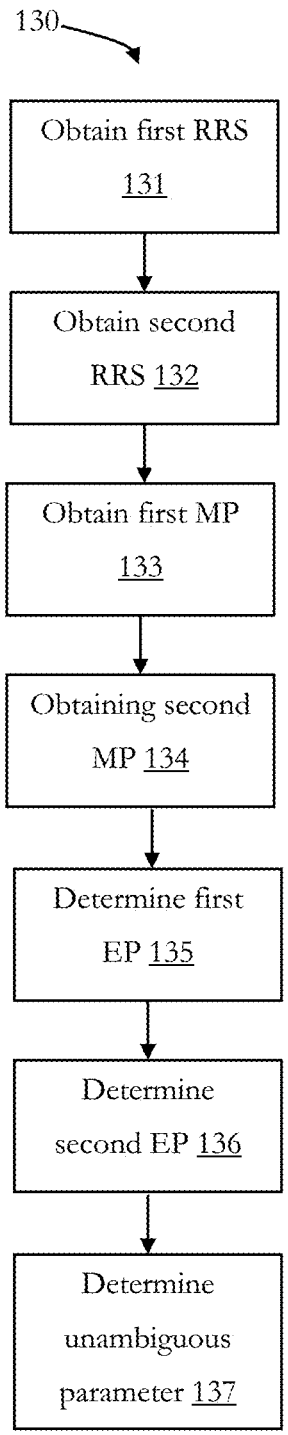
FIG. 17 depicts an embodiment of a radar determination method according to the present disclosure in a block diagram in which estimated parameters are obtained.

FIG. 17 depicts a radar determination method 130 according to the present disclosure in a block diagram which is different: from the radar determination method 120 in that estimated parameters are obtained.

At 132, a first received radar signal is obtained, as discussed herein.

At 132, a second received radar signal is obtained, as discussed herein.

At 133, a first measured parameter is obtained, as discussed herein.

At 134, a second measured parameter is obtained, as discussed herein.

At 135, a first estimated parameter is obtained based on the Chinese Remainder Theorem, as discussed herein.

At 136, a second estimated parameter is obtained based on the Chinese Remainder Theorem, as discussed herein.

At 137, an unambiguous parameter is determined, as discussed herein, which is, in this embodiment, an unambiguous velocity.

Figure 18:
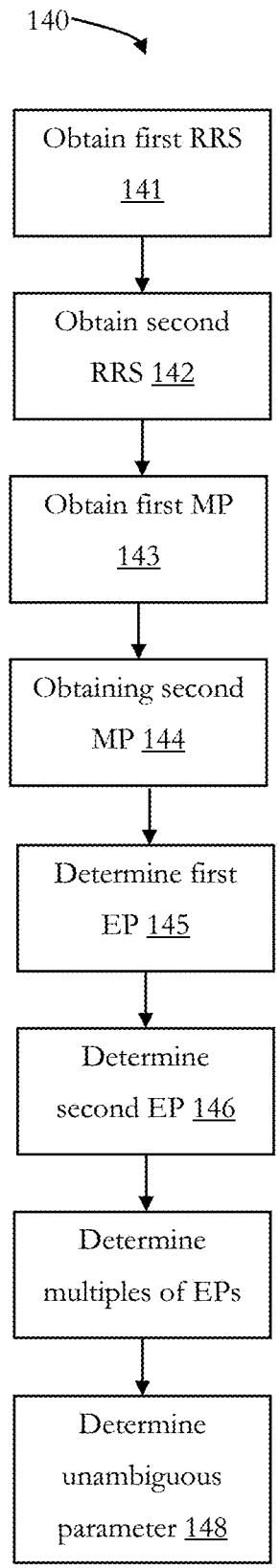
FIG. 18 depicts an embodiment of a radar determination method according to the present disclosure in a block diagram in Which hypotheses of the estimated parameters are obtained.

FIG. 18 depicts a radar determination method 140 according to the present disclosure in a block diagram, which is different from the radar determination method 140 in that hypotheses of the estimated parameters are obtained.

At 141, a first received radar signal is obtained, as discussed herein.

At 142, a second received radar signal is obtained, as discussed herein.

At 143, a first measured parameter is obtained, as discussed herein.

At 144, a second measured parameter is obtained, as discussed herein.

At 145, a first estimated parameter is obtained based on the Chinese Remainder Theorem, as discussed herein.

At 146, a second estimated parameter is obtained based on the Chinese Remainder Theorem, as discussed herein.

At 147, hypotheses of the first and the second estimated parameters are determined, as discussed herein.

At 148, an unambiguous parameter is determined, as discussed herein, which is, in this embodiment, an unambiguous position.

It should be recognized that the embodiments describe methods with an exemplary ordering method steps. The specific ordering of method steps is however given for illustrative purposes only and should not be construed as binding. For example the ordering of 111 and 112, or 121 and 122, or 131 and 132, or 141 and 142 in the embodiments of FIGS. 15 to 18 may be exchanged. Also, the ordering of 123 and 124, or 133 and 134, or 143 and 144 in the embodiments of FIGS. 16 to 18 may be exchanged. Further, also the ordering of 135 and 136, or 145 and 146 in the embodiments of FIGS. 17 and 18 may be exchanged. Other changes of the ordering of method steps may be apparent to the skilled person.

Please note that the division of the radar determination circuitry of FIGS. 3 to 9 into functional units is only made for illustration purposes and that the present disclosure is not limited to any specific division of functions in specific units. For instance, the radar determination circuitry could be implemented by a respective programmed processor, field programmable gate array (FPGA) and the like.

Methods according to the present disclosure can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can; if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Radar determination circuitry configured to:
  obtain a first received radar signal representing a first transmitted radar signal reflected at a scene;
  obtain a second received radar signal representing a second transmitted radar signal reflected at the scene, wherein.
  the first transmitted radar signal and the second transmitted radar signal have a common chirp repetition frequency, and wherein
  the first transmitted radar signal is based on a first carrier frequency and the second transmitted radar signal is based on a second carrier frequency different from the first carrier frequency; and
  determine an unambiguous parameter based on the first and the second received radar signals.

(2) The radar determination circuitry of (1), wherein the unambiguous parameter includes at least one of an unambiguous distance, an unambiguous position, an unambiguous velocity, and an unambiguous angle.

(3) The radar determination circuitry of (1) or (2), wherein the at least two transmitted radar signals are transmitted simultaneously.

(4) The radar determination circuitry of anyone of (1) to (3), further configured to:
  determine a first measured parameter based on the first received radar signal, the first measured parameter being subject to a measurement ambiguity; and
  determine a second measured parameter based on the second received radar signal, the second measured parameter being subject to a measurement ambiguity.

(5) The radar determination circuitry of (4), further configured to:
  determine a first estimated parameter based on the first measured parameter; and
  determine a second estimated parameter based on the second measured parameter.

(6) The radar determination circuitry of (5), further configured to:
  determine hypotheses of the first and the second estimated parameters; and
  determine the unambiguous parameter, if respective hypotheses of the first and the second estimated parameters correspond to each other.

(7) The radar determination circuitry of (6), wherein the correspondence of the hypotheses includes a difference of the hypotheses being below a predetermine threshold or a ratio of the hypotheses being within a predetermined range.

(8) The radar determination circuitry of anyone of (1) to (7), further configured to:
  determine the unambiguous parameter for at least two radar frames, thereby obtaining an unambiguous parameter for each frame.

(9) The radar determination circuitry of (8), further configured to:

select a predetermined number of unambiguous parameters obtained for each frame; and
average the unambiguous parameters.

(10) The radar determination circuitry of (8) or (9), further configured to:
carry out a cross-disambiguation of the unambiguous parameters for each frame.

(11) Radar determination method compost.
obtaining a first received radar signal representing a first transmitted radar signal reflected at a scene;
obtaining a second received radar signal representing a second transmitted radar signal reflected at the scene, wherein
the first transmitted radar signal and the second transmitted radar signal have a common chirp repetition frequency, and wherein
the first transmitted radar signal is based on a first carrier frequency and the second transmitted radar signal is based on a second carrier frequency different from the first carrier frequency; and
determining an unambiguous parameter based on the first: and the second received radar signals.

(12) The radar determination method of (11 wherein the unambiguous parameter includes at least one of an unambiguous distance, an unambiguous position, an unambiguous velocity, and an unambiguous angle.

(13) The radar determination method of (11) or (12), wherein the at least two transmitted radar signals are transmitted simultaneously.

(14) The radar determination method of anyone of (11) to (13), further comprising:
determining a first measured parameter based on the first received radar signal, the first measured parameter being subject to a measurement ambiguity; and
determining a second measured parameter based on the second received radar signal, the second measured parameter being subject to a measurement ambiguity.

(15) The radar determination method of (14), further comprising:
determining a first estimated parameter based on the first measured parameter; and
determining a second estimated parameter based on the second measured parameter.

(16) The radar determination method of (15), further comprising:
determining hypotheses of the first and the second estimated parameters; and
determining the unambiguous parameter, if respective hypotheses of the first and the second estimated parameters correspond to each other.

(17) The radar determination method of (16), wherein the correspondence of the hypotheses includes a difference of the hypotheses being below a predetermine threshold or a ratio of the hypotheses being within a predetermined range.

(18) The radar determination method of anyone of (11) to (17), further comprising:
determining the unambiguous parameter for at least two radar frames, thereby obtaining an unambiguous parameter for each frame.

(19) The radar determination method of (18), further comprising:
selecting a predetermined number of unambiguous parameters obtained for each frame; and
averaging the unambiguous parameters.

(20) The radar determination method of (18) or (19), further comprising:
carrying out a cross-disambiguation of the unambiguous parameters for each frame.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Radar determination circuitry configured to:
obtain a first received radar signal representing a first transmitted radar signal reflected at a scene;
obtain a second received radar signal representing a second transmitted radar signal reflected at the scene, wherein
the first transmitted radar signal and the second transmitted radar signal have a common chirp repetition frequency and a same frame length, enabling simultaneous processing of data corresponding to the first and second transmitted radar signals, and wherein
the first transmitted radar signal is based on a first carrier frequency and the second transmitted radar signal is based on a second carrier frequency different from the first carrier frequency;
simultaneously process the first received radar signal and the second received radar signal;
determine a first measured parameter based on the first received radar signal, the first measured parameter being subject to a measurement ambiguity;
determine a second measured parameter based on the second received radar signal, the second measured parameter being subject to a measurement ambiguity; and
compare the first measured parameter and the second measured parameter to determine an unambiguous parameter.

2. The radar determination circuitry of claim 1, wherein the unambiguous parameter includes at least one of an unambiguous distance, an unambiguous position, an unambiguous velocity, and an unambiguous angle.

3. The radar determination circuitry of claim 1, wherein the first and second transmitted radar signals are transmitted simultaneously.

4. The radar determination circuitry of claim 1, further configured to:
determine a first estimated parameter based on the first measured parameter; and
determine a second estimated parameter based on the second measured parameter.

5. The radar determination circuitry of claim 4, further configured to:
determine hypotheses of the first and the second estimated parameters; and
determine the unambiguous parameter, if respective hypotheses of the first and the second estimated parameters correspond to each other.

6. The radar determination circuitry of claim 5, wherein the correspondence of the hypotheses includes a difference of the hypotheses being below a predetermined threshold or a ratio of the hypotheses being within a predetermined range.

7. The radar determination circuitry of claim 1, further configured to:
   determine the unambiguous parameter for at least two radar frames, thereby obtaining an unambiguous parameter for each frame.

8. The radar determination circuitry of claim 7, further configured to:
   select a predetermined number of unambiguous parameters obtained for each frame; and
   average the unambiguous parameters.

9. The radar determination circuitry of claim 7, further configured to:
   carry out a cross-disambiguation of the unambiguous parameters for each frame.

10. Radar determination method comprising:
    obtaining a first received radar signal representing a first transmitted radar signal reflected at a scene;
    obtaining a second received radar signal representing a second transmitted radar signal reflected at the scene, wherein
    the first transmitted radar signal and the second transmitted radar signal have a common chirp repetition frequency and a same frame length, enabling simultaneous processing of data corresponding to the first and second transmitted radar signals, and wherein
    the first transmitted radar signal is based on a first carrier frequency and the second transmitted radar signal is based on a second carrier frequency different from the first carrier frequency;
    processing the first received radar signal and the second transmitted radar signal simultaneously; and
    determining an unambiguous parameter based on the first and the second received radar signals by resolving a measurement ambiguity using a difference between the first carrier frequency and the second carrier frequency.

11. The radar determination method of claim 10, wherein the unambiguous parameter includes at least one of an unambiguous distance, an unambiguous position, an unambiguous velocity, and an unambiguous angle.

12. The radar determination method of claim 10, wherein the first and second radar signals are transmitted simultaneously.

13. The radar determination method of claim 1, further comprising:
    determining a first estimated parameter based on the first measured parameter; and
    determining a second estimated parameter based on the second measured parameter.

14. The radar determination method of claim 13, further comprising:
    determining hypotheses of the first and the second estimated parameters; and
    determining the unambiguous parameter, if respective hypotheses of the first and the second estimated parameters correspond to each other.

15. The radar determination method of claim 14, wherein the correspondence of the hypotheses includes a difference of the hypotheses being below a predetermine threshold or a ratio of the hypotheses being within a predetermined range.

16. The radar determination method of claim 10, further comprising:
    determining the unambiguous parameter for at least two radar frames, thereby obtaining an unambiguous parameter for each frame.

17. The radar determination method of claim 16, further comprising:
    selecting a predetermined number of unambiguous parameters obtained for each frame; and
    averaging the unambiguous parameters.

18. The radar determination method of claim 16, further comprising:
    carrying out a cross-disambiguation of the unambiguous parameters for each frame.

* * * * *